(12) United States Patent
Goncze et al.

(10) Patent No.: US 6,604,687 B2
(45) Date of Patent: Aug. 12, 2003

(54) THERMAL FLUID CONTROL VALVE

(75) Inventors: Zoltan Goncze, Northbrook; Jim Graves, Lake Forest, both of IL (US)

(73) Assignee: Marks Controls Corporation, Skokie, IL (US)

( * ) Notice: Subject to any disclaimer, the term of this patent is extended or adjusted under 35 U.S.C. 154(b) by 0 days.

(21) Appl. No.: 09/907,371

(22) Filed: Jul. 17, 2001

(65) Prior Publication Data
US 2003/0089787 A1 May 15, 2003

(51) Int. Cl.[7] ............................................... G05D 23/13
(52) U.S. Cl. ...................................... 236/12.2; 236/100
(58) Field of Search ............................ 236/12.2, 12.21, 236/100

(56) References Cited

U.S. PATENT DOCUMENTS

| | | | |
|---|---|---|---|
| 4,607,788 A | * | 8/1986 | Bendall et al. ............ 236/12.2 |
| 4,760,953 A | * | 8/1988 | Trubert ........................ 137/607 |
| 4,863,097 A | * | 9/1989 | Avelov ........................ 236/12.2 |
| 5,340,018 A | * | 8/1994 | MacDonald ................ 236/12.2 |
| 5,779,139 A | * | 7/1998 | Ueno .......................... 236/12.2 |
| 5,931,374 A | * | 8/1999 | Knapp .................... 137/625.41 |
| 5,979,777 A | * | 11/1999 | Ems ............................. 236/100 |

* cited by examiner

Primary Examiner—William E. Tapolcai
Assistant Examiner—Mohammad M. Ali
(74) Attorney, Agent, or Firm—Vedder, Price, Kaufman & Kammholz

(57) ABSTRACT

A thermal control valve provides more accurate control of the valve outlet temperature for a high flow rate valve in a low flow rate environment. The valve utilizes a thermal motor to close the valve during high temperature operation and includes flow-directing element that restricts the flow of water through the valve at low pressures and directs the flow of water toward the thermal motor. The flow-directing encircles the thermal motor and is formed from a flexible material so that it expands under pressure of water flowing through the valve.

20 Claims, 3 Drawing Sheets

THERMAL FLUID CONTROL VALVE

BACKGROUND OF THE INVENTION

The present invention generally relates to fluid control valves, and more particularly, to a thermostatic control valve that operates more reliably throughout a wide range of flow rates.

Thermostatic control valves for fluid systems, especially hot water systems, have been known for years. These valves are used to set a maximum temperature for a fluid in a system to attain. As such, they are commonly used in hot water feed lines for bath and shower applications in order to prevent scalding by a user of the system. The operation of these type vales is relatively straightforward.

Typically, these valves use some sort of thermostatic element, commonly referred to in the art as a "motor", that is designed to move in certain direction based upon increases or decreases in temperature of the fluid passing around them. These elements are disposed within a fluid passage in the interior of the valve body and are typically biased in one direction by a spring. The thermal element, or motor, serves to operate a closing element that moves within the valve body to close off the valve so as to prevent the flow of hot water through the valve. In this manner, these valves may be used to temper a hot water supply to prevent inadvertent scalding by a user of the water system, which may occur when the fluid system is temporarily purged of cold water.

One type of thermostatic control valve that is exemplary of thermostatically controlled valves in the art, is described in U.S. Pat. No. 4,299,354, issued November 1, 1981. In this valve, a thermally responsive motor is formed as a cylindrical member that is biased into an open position. The motor is positioned within the flow passage of the valve within the body of the valve. Separate hot and cold water inlets are provided in the valve body so that respective amounts of hot and cold water enter the valve body and may be mixed together before the combined water exits the valve body. The passages present in the body of this valve that direct the water from the inlets into the valve flow passage are positioned around the edge of the flow passage and are not directed toward the thermal motor. As such, at low water flows through the valve, hot water may enter the valve body and travel through the valve without coming directly into contact with the thermal motor. Thus, there exists the risk in valve constructions such as this, that the thermal motor may not sense a change in temperature such as may occur when cold water is suddenly purged from the system, resulting in scalding to a user.

The present invention is directed to an improved thermally responsive valve that overcomes the aforementioned shortcomings.

SUMMARY OF THE INVENTION

Accordingly, it is a general object of the present invention to provide an improved thermally responsive valve that operates reliably at low flow conditions.

Another object of the present invention is to provide a thermal control valve that incorporates a dynamic water directing member that restricts the diameter of the flow passage in which the thermal motor of the valve sits without unduly restricting the flow of water through the flow passage.

A further object of the present invention is to provide a thermal control valve having a valve body and a thermal motor disposed longitudinally therein within a longitudinal flow passage of the valve, and the flow passage including a flow directing member mounted thereto having a generally frusto-conical shape that forms a flow restriction within the flow passage, the flow-directing member being formed from a flexible material that expands radially outwardly under pressure of water passing through the valve body flow passage, the flow-directing member having a diameter that changes in response to the flow of water through the valve body flow passage.

Yet another object of the present invention is to provide an improved thermally actuated valve having a central flow passage extending through a body of the valve, a thermal motor disposed within the flow passage and movable between at least first and second positions in which the valve flow passage is open and closed, and a flexible flow-directing member that directs water entering the flow passage against the exterior of the thermal motor at all water pressures, the flow-directing member having an expandable diameter that expands from a minimum diameter to a maximum diameter.

The present invention accomplishes these and other objects through its novel and unique structure. As evidence by the preferred embodiment of the invention, a valve assembly is provided having a plurality of parts, that cooperatively define a valve body having at least two inlets for receiving incoming hot and cold water, an outlet for the water, mixed or otherwise, to flow out the valve, a thermal motor disposed in the valve passage and movable between open and closed positions in response to the temperature of the water flowing into the valve, and a flow-directing member that directs the flow of water entering the valve at the exterior of the thermal motor so that the motor can accurately respond to the temperature of the water at all pressures.

In an important aspect of the present invention, the flow-directing member is a "dynamic" member, meaning that it changes shape in response to the pressure differential through the valve. In its normal condition, the flow-directing member has a shape similar to a truncated cone, or a frusto-conical configuration with a first diameter that is slightly larger than the diameter of the thermal motor. The flow-directing member is expandable under water pressure and is capable of expanding to a diameter much greater than its first diameter so as not to unduly restrict the flow of water passing through the valve.

The flow-directing member is preferably formed of rubber or other similar elastomeric material and it has a base for supporting it within a holder and a conical portion that extends from the base. The conical portion is corrugated so that it can flex and the diameter of the conical portion can expand to a second maximum diameter to permit the unimpeded passage of water through the valve at high flows.

These and other objects, features and advantages of the present invention will be clearly understood through a consideration of the following detailed description.

BRIEF DESCRIPTION OF THE DRAWINGS

In the course of this detailed description, the reference will be frequently made to the attached drawings in which.

DETAILED DESCRIPTION OF THE PREFERRED EMBODIMENTS

Figure 1:
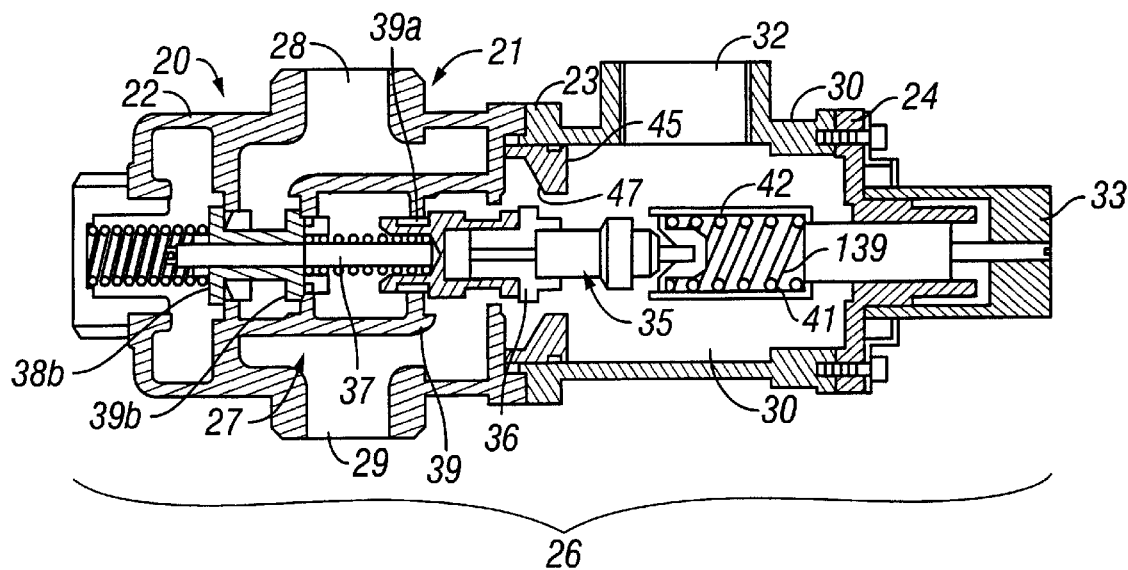
FIG. 1 is a sectional view, taken longitudinally through a known thermostatic control valve.

FIG. 1 illustrates a known thermostatic control valve 20. This valve 20 includes a valve body 21 that may be formed of a plurality of pieces, 22–24 that are assembled together to form the valve and which cooperatively define a valve body 26 that has an interior flow passage 27 through which a fluid, typically water, flows. At one end of the valve 20, an inlet 27 is defined and contains two distinct inlets 28, 29, each of which is adapted to be connected to respective hot and cold water supplies. The inlets communicate with the interior passage 27 which serves as a mixing chamber to mix the two fluids together. In instances when such a valve is used in a water system, hot and cold water will mix together in the interior passage 27. Openings (not shown) permit the incoming water to flow into the downstream portion 30 of the flow passage and out of the valve 20 through an outlet 32 formed in the downstream portion 30. An end member 33 is provided to close off the end of the downstream portion 30.

This type of valve will typically include a thermally responsive member 35, which is typically known in the art as a "motor". This motor 35 may have an internal portion formed from paraffin or another type of wax which may change its volume in response to temperature. The motor 35S as illustrated in FIG. 1 is connected to an adaptor 36 that supports a valve stem assembly 37, having hot and cold water poppets 38a, 38b thereon and which are positioned within seats 39 of the valve body 21. A spring assembly 41 may be provided within an overload cage 42 that may be adjusted to set the range of movement for the valve motor 35.

When this valve 20 is operated, water will flow into the downstream portion 30 through and near the valve seat 39. This water may impact against the sides of the interior passage 27. In instances where the cold water entering the inlet is shut off or suddenly purged from the system, or in instances of low water flow or changes in pressure through the valve, the hot water may not necessarily come into contact with the thermal motor 35 and cause it to move backwards in FIG. 1 and shut off the flow of water through the valve. In order to overcome this problem, valve makers have developed static, or fixed flow directing members, which typically include conical members 45 that are rigid, and formed of metal as a separate casting, which are affixed to the valve 20 within the downstream portion 30 of the valve 20. These conical members 45 have an angled surface 47 that directs the incoming water toward the exterior of the valve motor 35.

However, although the angled surface 47 of the funnel 45 works at directing the incoming water at the valve motor 35 at high pressure drops and at high flow rates, it is spaced away from the thermal motor so as not to impede the flow of water through the flow passage and therefore it does not effectively direct the incoming water at low water flows and low pressure drops, where the water may have a tendency to move along the surfaces of the funnel toward the valve outlet without coming into contact with the exterior of the valve motor 35. In such instances, water that is hot may pass through the valve without actuating the valve motor quickly enough to prevent the exit of the hot water, thereby increasing the likelihood of scalding to a user of the water system because of the potential slow response time of the motor.

Figure 2:
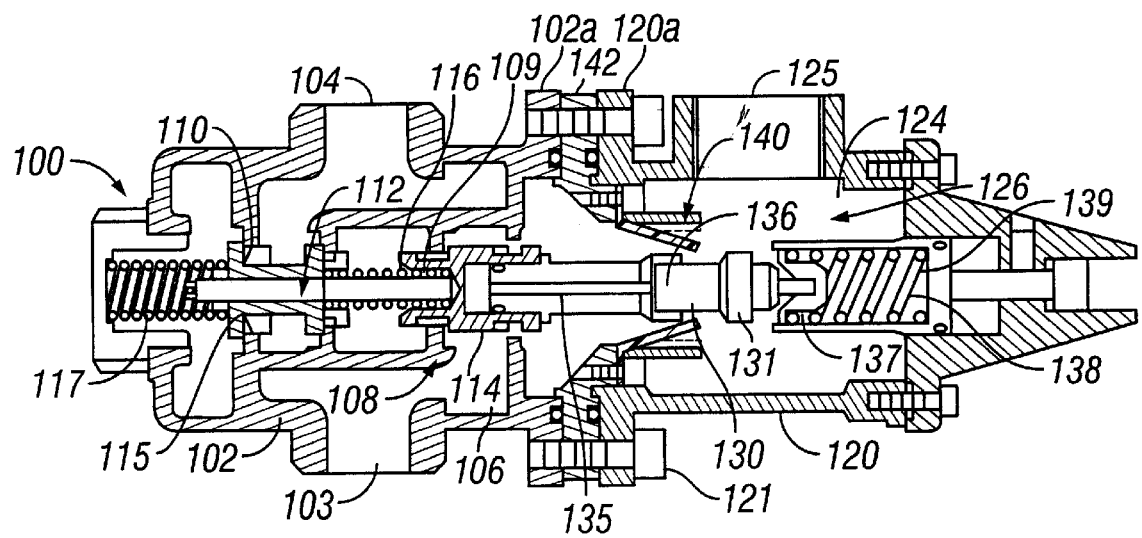
FIG. 2 is a longitudinal sectional view of a improved thermostatic control valve constructed in accordance with the principles of the present invention.

The present invention is directed to an improved control valve that substantially eliminates the potential for accidental scalding due to reduced valve sensitivity at low flow rates. FIG. 2 illustrates a valve 100 constructed in accordance with the principles of the present invention. In this valve, means are provided to direct the water flowing into the valve into contact with the thermal motor. As shown best in FIG. 2, the valve 100 of the invention is assembled from a plurality of components, including a hollow body member 102 that includes a hot water inlet 103 and a cold water inlet 104, each of the inlets communicating with an internal extension of the inlets that come together to define a common flow passage, or mixing chamber 106. The valve may include a conventional internal valve seat structure 108 that preferably includes a hot water valve seat 109 and a cold water valve seat 110 which are centrally located within the valve body 102. A valve stem assembly 112 extends longitudinally through the valve body 102 and the seats 109, 110 and includes a valve plug member, shown as separate hot and cold water poppets 114, 115 that are biased into an initial position and spaced apart from each along the valve stem assembly 112 by a pair of springs 116, 117.

A hollow motor housing 120 is provided that is attached to the valve body member 102 by a series of bolts 121 that extend through opposing flanges 102a, 120a of the valve body member 102 and motor housing 120 as well as a funnel support member, illustrated as a cage member 142. The motor housing 120 includes a central cavity 124 with an outlet portion 125 that provides an exit for water to leave the valve 100. The motor 130 houses a thermal, or wax motor assembly 126, which includes a wax or paraffin-based motor 130 that changes its volume by expanding or contracting in response to a change (i.e., increase or decrease) in temperature of the fluid passing through the valve 100 to thereby move to the valve stem assembly 112 forwardly or rearwardly within the valve body. As is known in the art and as used in one embodiment of the invention, the motor 130 may include an exterior housing 131 having an internal cavity (not shown) that is filled with a thermal expansion material, such as wax or paraffin the volume of which changes significantly with variations in the surrounding temperature. The thermal expansion material moves against a piston rod, or end stem 132 that may be disposed at either end of the motor 130. When the temperature of the motor 130 changes in response to a change in the temperature of the surrounding fluid, the piston 132 will move either to the right or left of FIG. 2 and thus displace the valve stem assembly 112, thereby causing the hot and/or cold water poppets 114, 115 to move in and out of their valves seats 109, 100, either opening or closing the hot and cold water inlets 103, 104. It will be understood that the reference herein to a "paraffin" or "wax" motor is merely by way of example. Other valve motors, such as electromechanical and gas-filled motors may be used with the present invention.

The motor 130 may include a motor adaptor 135 that is disposed at one end 136 thereof and an insert 137 at its other end that is supported by an overload spring 138 and housing 139. The return spring 117 exerts a force against the valve stem assembly, and which is transmitted to the motor 130.

The wax motor 130 relies upon change in the temperature of its surrounding environment. As noted above with respect to the prior art valve shown in FIG. 1, at low water flow, hot water entering the valve at low flow rates may run along the interior walls of the flow passage and through the outlet for a time without entirely contacting the exterior casing of the valve motor. In this instance, the flow passage may eventually heat up and the thermal motor will respond, but the time it takes for that to occur may be long enough to permit unimpeded flow of the hot water through the valve. Water heater temperatures may be set by a user at between 140 degrees F. to a maximum of 180 degrees F. At the low end of this range, scalding may occur to a user with exposure in as little as one second. The present invention is directed to a solution of this high flow rate valve's unresponsiveness in low flow situations.

Figure 3:
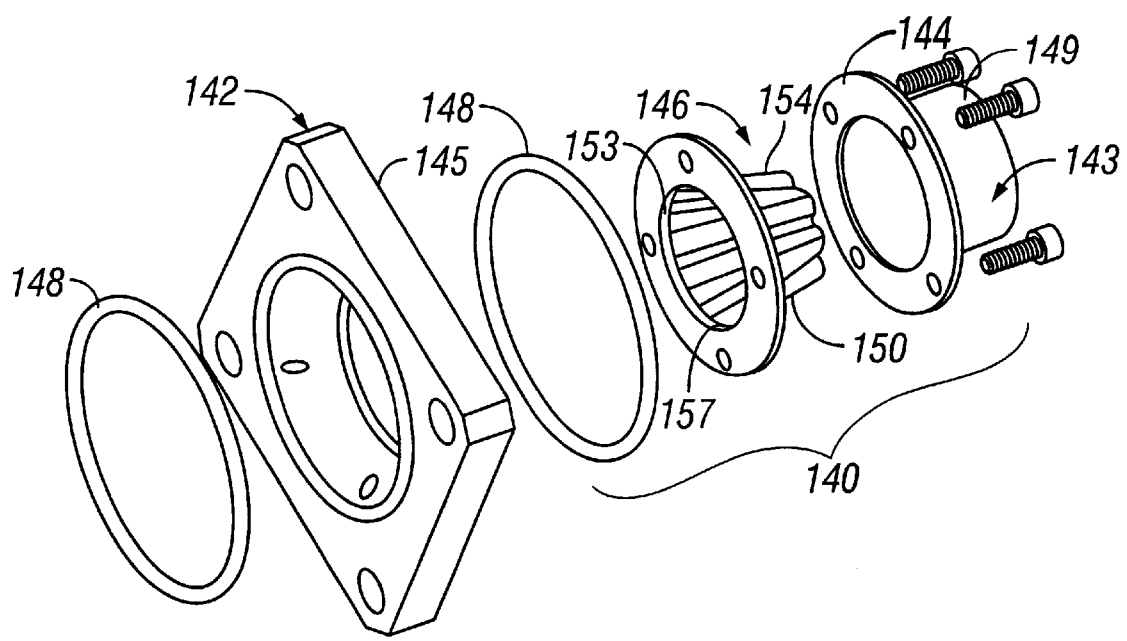
FIG. 3 is an exploded view of the flexible restrictor assembly used in the valve of FIG. 2.

In an important aspect of the present invention, a flow directing assembly 140 is provided as part of the valve 100. As shown in FIG. 3, this flow directing assembly includes a support member, illustrated as a cage member 142 that is interposed between the valve body 102 and the motor housing 120. The assembly 140 further includes a retainer 143 with a flange 144 that mates with an opposing surface 145 of the cage member 142. A flow-directing member 146 is interposed between the retainer 143 and the cage 142 and is positioned such that the flow directing member 146 encircles the exterior of the thermal motor 130 so that it may direct fluid flowing through the valve 100 directly at the thermal motor 130, so that even at low flow rates, the fluid will contact the valve motor 130 and keep it aware of the proper temperature of the fluid. O-rings 148 may be used to provide a seal between the valve body, housing and flow directing assembly.

Figure 4:
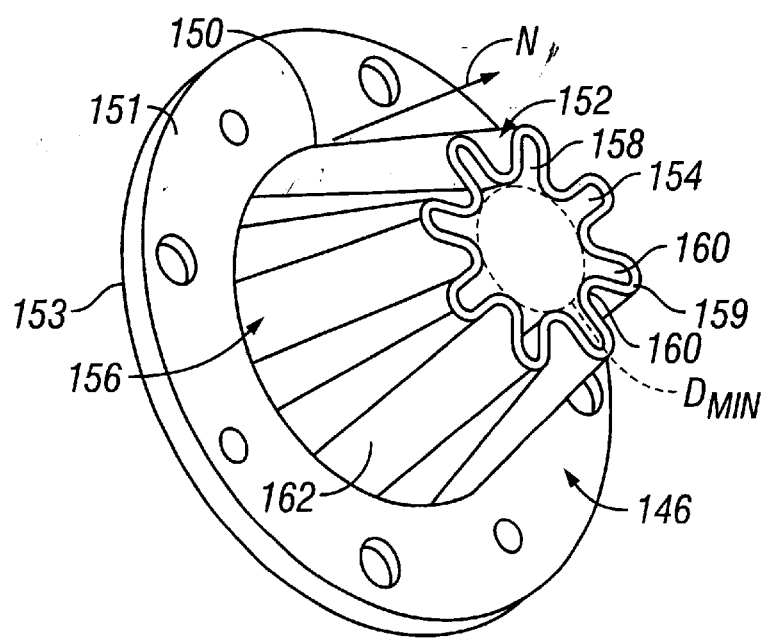
FIG. 4 is a perspective view of the flexible restrictor used in the assembly of FIG. 3.

In the embodiment illustrated, the flow-directing member 146 takes the shape of a flexible funnel 150 having a truncated cone, or frusto-conical configuration. FIG. 4 illustrates the flexible funnel 150 in detail. It can be seen that the flexible funnel 150 includes a base portion in the form of a mounting flange 151 and a funnel body portion 152 that extends away from the flange 151 and which tapers at a predetermined angle from a line N extending normally from the funnel flange 151. The flexible funnel 150 has an inlet 153 and outlet 154, with the inlet 153 being disposed at the base of the funnel 150 and within the mounting flange 151. The inlet 153 has a fixed, or "static" opening 157 of a preselected diameter. The outlet 154 is spaced apart from the inlet 153 and has a "dynamic" opening 158 that is variable in its size, or diameter. As used herein, the term "dynamic" means that the outlet opening 158 changes in size in accordance with the pressure drop and amount of fluid passing through the valve 100. In this regard, the outlet opening 154 may be considered to have a minimum diameter DMIN and a maximum diameter DMAX, and the operation of the outlet opening between these two diameters will be explained in greater detail below.

The funnel 150 is formed from a "flexible" material, that is, a material that can expand under pressure. In the preferred embodiment, this material is preferably a rubber, or elastomeric material. However, it will be noted that other materials may be used to construct the funnel, provided they are capable of the desired expansion characteristics. Furthermore, it will be understood that the flow restriction element need not be funnel-shaped, but may take the form of a "duckbill" sleeve as is known in the art, that has an outlet opening in the form of a slit that may contact the exterior of the valve motor.

Figure 5:
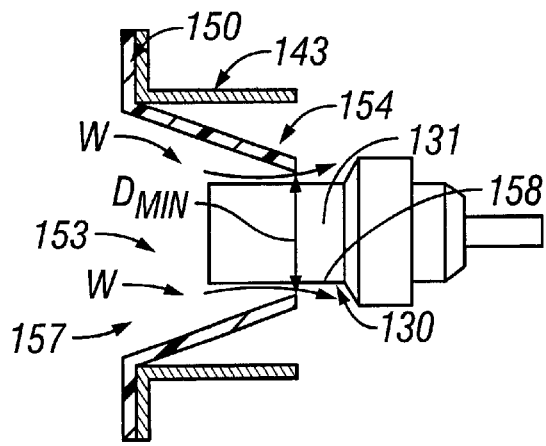
FIG. 5 is a sectional, detailed view of the flexible restrictor and valve motor under low fluid flow conditions, illustrating the flexible restrictor in an unexpanded state.

As shown in FIGS. 4 & 5, the funnel 150 has a generally flat base flange 151 with a body 152 extending outwardly therefrom in a tapering fashion, preferably at an angle from an imaginary line N that is drawn normal (or perpendicular) from the base flange 151. This angle may vary and it affects the minimum diameter attainable at the funnel outlet. The funnel body 152, in another important aspect of the present invention, is expandable and in the embodiment illustrated, is formed with corrugations 156 that longitudinally extend for the length of the funnel body 152. These corrugations 156 give the funnel body 152 the ability to expand under high flow rates and to ensure expansion, the funnel outlet 154 is not secured to any part of the valve 100, and remains a "free" end that is free to expand and contract in response to the pressure differential of the water flowing through the vale 100.

The corrugations also provide stability to the funnel body 152 and its outlet 154 and they define a series of grooves 162 that are spaced apart from each other circumferentially around the funnel body 152 and may be considered as defining in the funnel body 152, "waves" having peaks, or high points 159 and troughs, or low points 160. The corrugations 156 also define a plurality of grooves, or channels 162 that extend around the funnel body 152 through which water flows at low pressures as explained below.

Figure 7:
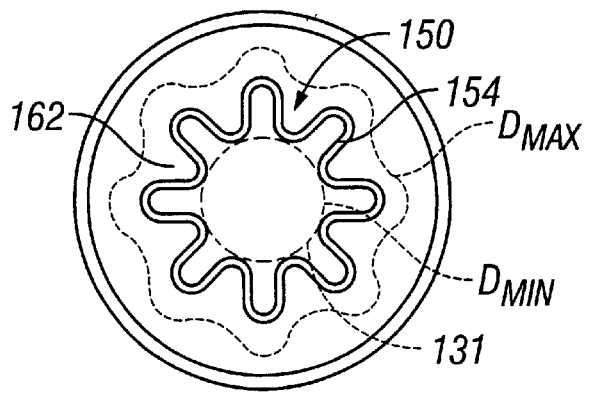

The funnel 150 is typically formed so that the troughs or low points 160 of the corrugations 156 collectively and tangentially define the minimum diameter DMIN of the funnel outlet 154. These low points may be spaced apart from the motor housing 131, or they may lie against the motor housing. In the case on the former, a flow path is define between the funnel outlet 154 and the motor housing 131 that includes the annular spacing between the funnel 150 and the motor housing, as well as the funnel grooves 162, and in the latter instance, the flowpath will include only the grooves 162. This is illustrated diagrammatically in FIG. 7 which shows the expansion of the funnel 150 between its minimum and maximum diameters. It will also be understood that the funnel outlet 154 may reach diameters between this range.

Figure 6:
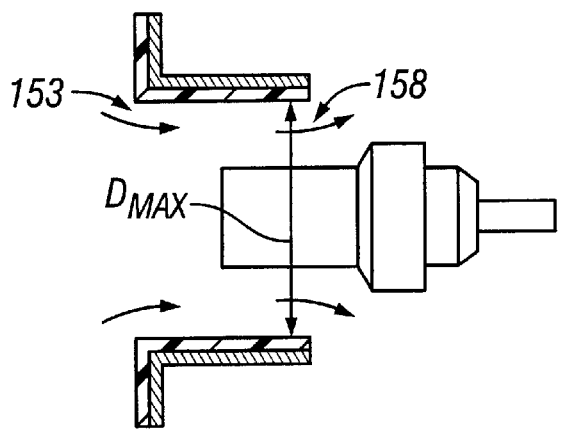
FIG. 6 is the same view as FIG. 5, but under high fluid flow conditions, illustrating the flexible restrictor in an maximum, expanded state; and, FIG. 7 is a diagram illustrating the variable diameter of the restrictor element outlet opening.

These grooves 162 assist in channeling water under low pressure drop onto the motor housing 131 so that the motor 130 will reliably and quickly sense the temperature of the water flowing through the valve 100 at low pressure drop or low flow rates. The grooves 162 also do not impede the flow of water through the valve 100. Furthermore, the corrugations 162 further provide an extra extent of funnel material that is capable of expansion, namely the parts of the funnel that form the low points or troughs 160 of the corrugations so that the funnel outlet may expand to its predetermined maximum diameter, DMAX, or any diameter between the minimum and maximum diameters. The maximum expansion that will occur is limited by the retainer sidewall 149 as illustrated in FIG. 6. The flow of water through the restrictor element and across the motor housing is illustrated in FIGS. 5 & 6 by the arrows W. The funnel outlet preferably has a minimum diameter that is equal to or slightly greater than the diameter of the motor, although in some applications that diameter may be smaller. In these latter applications, the grooves in the restrictor element outlet will serve to create discrete flow paths around the motor housing for water to flow at low pressures. Additionally, while the present invention has been described and illustrated in this description as utilizing a motor with a cylindrical configuration, it will be understood that other configurations of the motor and restrictor element may be used. In non-cylindrical or circular applications, it is desired to provide the restrictor element outlet in a configuration that is generally complementary to that of the motor housing configuration.

In practice, funnels of the invention have been constructed and used successfully having an inlet diameter of about 1.11 inches and an outlet diameter of about 0.49 inches, so that ideally, the funnel may have a range of over 200% expansion. It will be understood that the funnel may be formed of "flexible" materials other than rubbers and elastomers. For example, it is contemplated that metal could be used to construct the funnel, in a segmented and expandable format. Furthermore, while the restrictor element outlet opening has been described in terms of "diameter", it will be understood that such a "circular"-type opening is just one of the configurations that the restrictor element outlet may take and the present invention is not limited to such a configuration.

While the preferred embodiment of the invention has been shown and described, it will be apparent to those skilled in the art that changes and modifications may be made therein without departing from the spirit of the invention, the scope of which is defined by the appended claims.

We claim:

1. A thermostatically controlled valve assembly, comprising:
   a valve body having a hot water inlet and a cold water inlet for receiving hot and cold water from respective hot and cold water supplies connected to said valve body, the valve body further including an outlet for discharge of water therefrom;
   a flow passage extending through said valve body and defining a passage for water to pass between said hot and cold water inlets and said outlet, the flow passage including a valve seat;
   a thermally responsive member disposed in said flow passage that moves in proportion to temperature of said water in said flow passage;
   a valve plug operatively connected to the thermally responsive member to move with said thermally responsive member; and,
   a restrictor element interposed in said flow passage between said valve body hot and cold water inlets and said valve body outlet, the restrictor element having inlet and outlet openings formed at opposite ends thereof, and an annular flow-directing surface extending therebetween, said restrictor element being disposed in said flow passage such that said restrictor element outlet surrounds said thermally responsive member and said flow-directing surface extends toward said thermally responsive member, whereby water passing through said flow passage is directed onto said thermally responsive member, said restrictor element outlet opening being expandable from a first diameter to a second diameter in response to pressure of water flowing through said flow passage.

2. The valve assembly as set forth in claim 1, wherein said restrictor element includes a flexible funnel and the restrictor element inlet has a fixed diameter that is larger than said restrictor element outlet such that said flow-directing surface extends from said restrictor element inlet to said restrictor element outlet at a gradual taper.

3. The valve assembly as set forth in claim 2, wherein said flexible funnel is formed from a rubber.

4. The valve assembly as set forth in claim 2, wherein said restrictor element is formed from an elastomeric material.

5. The valve assembly as set forth in claim 1, wherein said thermally responsive member includes a motor having an exterior surface, and said restrictor element is disposed within said valve so as to position said restrictor element outlet around a portion of said thermal motor body.

6. The valve assembly as set forth in claim 1, wherein said restrictor element includes a mounting flange that extends around said restrictor element inlet, an d said flow directing surface is corrugated so as to define a plurality of grooves extending longitudinally along said flow directing surface.

7. The valve assembly as se t forth in claim 2, wherein said funnel includes a base portion for mounting to said valve and a body portion having a configuration of a truncated cone, the body portion including a plurality of corrugations.

8. The valve assembly as set forth in claim 7, wherein said corrugations define a plurality of grooves spaced circumferentially along said funnel body portion.

9. The valve assembly as set forth in claim 1, wherein said flow-directing surface includes a plurality of corrugations that extend longitudinally and proximately between said restrictor element inlet and outlet openings to thereby define a plurality of grooves circumferentially spaced apart from each other around said flow-directing surface.

10. The valve assembly as set forth in claim 1, wherein said motor exterior surface has a preselected configuration and said restrictor element outlet has a configuration which is complementary to that of said motor exterior surface.

11. The valve assembly as set forth in claim 10, wherein said motor is cylindrical with a given diameter, and said restrictor outlet first diameter is equal to or greater than said motor diameter.

12. A valve for use in a water supply system and having improved thermal sensing capabilities, the valve comprising:
   a valve body including a hot water inlet and a cold water inlet for connecting said valve to respective supplies of hot and cold water supplies, the valve body further including an outlet for water entering said valve body to exit and a flow passage extending between said hot water inlet, cold water inlet and outlet;
   a poppet assembly moveable along an axis of said valve body for opening and closing said hot water and cold water inlets;
   a thermal motor that moves along the valve axis in response to temperature of water flowing through said flow passage; and,
   a variable restrictor element disposed in said flow passage between said hot water inlet and said outlet and at least partially surrounding a portion of said valve motor so as to direct the water flowing through said valve into contact with said valve motor, the restrictor element having an inlet and an outlet, the restrictor element outlet having an opening that is variable in size under water flow conditions through said valve body between a first-sized opening and a second-sized opening, said restrictor element being formed from a flexible material that expands at said outlet opening from said first-sized opening to said second-sized opening under pressure of said water flowing through said valve.

13. The valve as set forth in claim 12, wherein said restrictor element includes a funnel having a base that includes means for attaching the funnel to said valve body, the base being disposed proximate to said restrictor element inlet and a conical body section that extends between said restrictor element inlet and outlet.

14. The valve as set forth in claim 13, wherein said funnel body portion is corrugated.

15. The valve as set forth in claim 13, wherein said funnel body portion includes a plurality of spaced-apart grooves that extend longitudinally between said restrictor element inlet and outlet.

16. The valve as set forth in claim 14, wherein said corrugations extend lengthwise along said funnel conical body portion, said corrugations providing extra material of said funnel that permits said restrictor element outlet opening to expand to said second-sized opening which is greater than said first-sized opening.

17. The valve as set forth in claim 12, wherein said valve body includes first and second portions, the valve body first portion enclosing said poppet assembly and the valve body second portion enclosing said motor, and said valve further including a restrictor element mounting member interposed between said valve body first and second portions, said restrictor element engaging said restrictor element mounting member such that said restrictor element outlet is disposed within said valve body second portion.

18. The valve as set forth in claim 12, wherein said thermal motor has a given diameter and said restrictor element first-sized opening is equal to or greater than the thermal motor diameter.

19. The valve as set forth in claim 12, wherein said restrictor element is formed from an elastomeric material.

20. A valve for use in a water supply system and having improved thermal sensing capabilities, the valve comprising:

a valve body including a hot water inlet and a cold water inlet for connecting said valve to respective supplies of hot and cold water supplies, the valve body further including an outlet for water entering said valve body to exit and a flow passage extending between said hot water inlet, cold water inlet and outlet;

a poppet assembly moveable along an axis of said valve body for opening and closing said hot water and cold water inlets;

a thermal motor that moves along the valve axis in response to temperature of water flowing through said flow passage, the thermal motor having a preselected configuration; and, a variable restrictor element disposed in said flow passage between said hot water inlet and said outlet and at least partially surrounding a portion of said valve motor so as to direct the water flowing through said valve into contact with said valve motor, the restrictor element having an inlet and an outlet, the restrictor element outlet having an opening with a configuration that is complementary to the configuration of said thermal motor, said restrictor element outlet opening being expandable from a first size to a second size under pressure of said water flowing through said valve, said restrictor element including includes means for engaging said valve body and a conical, corrugated body section that extends between said restrictor element inlet and outlet.

* * * * *